United States Patent [19]

Le

[11] Patent Number: 5,199,683
[45] Date of Patent: Apr. 6, 1993

[54] BLOWOUT PREVENTER OPENING MECHANISM

[75] Inventor: Tri C. Le, Fort Bend County, Tex.

[73] Assignee: Baroid Technology, Inc., Houston, Tex.

[21] Appl. No.: 896,054

[22] Filed: Jun. 9, 1992

[51] Int. Cl.⁵ .......................................... E21B 33/06
[52] U.S. Cl. .................................. 251/1.3; 137/614.17
[58] Field of Search ............................ 251/1.1, 1.3; 137/614.17, 614.16

[56] References Cited

U.S. PATENT DOCUMENTS

| | | |
|---|---|---|
| 931,228 | 8/1909 | Schutte . |
| 1,064,660 | 6/1913 | Klee . |
| 1,157,870 | 10/1915 | Houser . |
| 1,836,506 | 12/1931 | Rasmussen et al. . |
| 2,177,164 | 10/1939 | Baash . |
| 2,795,391 | 6/1957 | Krone et al. . |
| 2,883,144 | 4/1959 | Kendig . |
| 2,965,074 | 12/1960 | Williamson . |
| 3,036,807 | 5/1962 | Lucky et al. ............. 251/1.3 X |
| 3,285,287 | 11/1966 | Curran . |
| 3,318,577 | 5/1967 | Banks . |
| 3,601,157 | 8/1971 | Milleville et al. . |
| 3,612,476 | 10/1971 | Leitgeb . |
| 4,024,884 | 5/1977 | Prescott et al. . |
| 4,132,265 | 1/1979 | Williams, Jr. . |
| 4,253,638 | 3/1981 | Troxell, Jr. . |
| 4,488,703 | 12/1984 | Jones . |
| 4,582,298 | 4/1986 | Jones et al. . |
| 4,589,625 | 5/1986 | Jones . |
| 4,638,972 | 1/1987 | Jones et al. ............. 251/1.3 |
| 4,655,431 | 4/1987 | Helfer et al. . |
| 4,877,217 | 10/1989 | Peil et al. . |
| 4,943,031 | 7/1990 | Van Winkle . |

OTHER PUBLICATIONS

Shaffer Catalog SPC-901, Pressure Control Equipment.

Primary Examiner—John C. Fox
Attorney, Agent, or Firm—Browning, Bushman, Anderson & Brookhart

[57] ABSTRACT

A blowout preventer comprises apparatus for allowing the pressure above and below its rams to equalize before the rams are opened. At least one of the rams has a bypass passageway therethrough disposed so as to allow communication between well zones above and below the rams, respectively. The bypass passageway also has a straight-sided tubular sealing section intermediate its ends. A sealing piston carrying a circumferential seal sized to engage the sealing section of the bypass passageway is reciprocable in that passageway to move the circumferential seal into and out of engagement with the sealing section and thereby respectively prevent or permit fluid flow through the bypass passageway. Where the actuator shaft for the ram is connected to the ram by a lost motion type connection, the sealing piston may be carried on the shaft. The sealing piston or other valve member may be carried on a carrier loosely mounted on an inner end of the shaft for lateral play, thereby allowing for "self-centering" of the valve element with respect to the surface against which it must seal.

19 Claims, 2 Drawing Sheets

BLOWOUT PREVENTER OPENING MECHANISM

BACKGROUND OF THE INVENTION

1. Field of the Invention

The present invention relates generally to blow out preventers and more specifically to apparatus for equalizing pressures above and below the closure members or rams in a blow out preventer (B.O.P.) prior to opening the rams. After such equalization occurs, the rams can move more easily to their open positions because there is no pressure differential urging them transverse to their path of movement. This allows a smaller operator to be used for opening the rams. The ram seals are subject to less friction and enjoy a longer life. Such equalization prevents damage to the rams or blow out preventer cavity which may occur if the rams are somewhat cocked due to the pressure differential at the time they are forced open.

2. Description of the Prior Art

A number of prior patents describe schemes for attempting to ease the opening of blowout preventers by equalizing pressures in two different zones, typically using a bypass passageway which extends through at least one of the rams. However, such pressure equalization mechanisms have frequently been prone to intermittent leakage, are often mechanically complicated, and sometimes do not equalize at the optimum time or between optimum zones.

Some prior devices, such as that shown in U.S. Pat. No. 4,638,972 to Jones et al and that shown in U.S. Pat. No. 3,036,807 to Lucky, do not equalize the pressures in the well bore above and below the rams, but rather, equalize the pressure above the rams with that behind or laterally outwardly of the rams. This does reduce the pressure which must be overcome to open the rams, but does not eliminate the aforementioned problem of a higher pressure downhole urging the rams upwardly, i.e. transverse to their path of movement. Thus, these systems do not reduce the amount of force necessary to open the rams as much as they might, and they also fail to eliminate problems with wear of the rams, their seals, and the surfaces of their housing cavities.

The Jones et al system, and at least some of the embodiments of the Lucky systems, also suffer disadvantages in that the valve which opens and closes the bypass passageway seats and seals in an axial direction (with respect to its direction of motion). Thus, a slight flaw in the valve or valve seat, or their alignment when seated, can easily cause leakage. Likewise, a little debris on the valve element or valve seat (a not unlikely occurrence when well fluid must, of necessity, enter the bypass passageway) can interfere with proper seating of such an axially oriented valve, and likewise cause leakage. Furthermore, the slightest axial movement can unseat the valve.

Other prior systems do equalize the pressures above and below the rams prior to opening, but virtually all of these likewise utilize axially oriented valves, which suffer from all of the last-mentioned disadvantages. Examples are shown in U.S. Pat. No. 4,655,431 to Helfer.

One characteristic of B.O.P.'s that sometimes prevents a satisfactory seal in a pressure equalization mechanism is relative movement between the sealing mechanism and the ram. U.S. Pat. No. 4,943,031 to D.W. Van Winkle shows a sealing mechanism intended to adjust to such relative movement of internal B.O.P. components by using a spring-loaded plunger to centralize a ball valve element on a seat. The Van Winkle mechanism has a number of problems besides the fact that his valve is axially oriented. Several moving parts are necessary. Also, the B.O.P. may not seal effectively if the pressure above the rams is higher than the pressure below because the higher pressure above the rams will have a tendency to unseat the spring-loaded ball. Such a condition may occur when ensuring proper installation of any pressure control equipment that may be added above the B.O.P.'s. Standard practice for many companies requires closing the B.O.P.'s and applying a high pressure above the B.O.P.'s to test such additional equipment, in other words a reverse differential pressure. With the Van Winkle spring-loaded ball valve, it may appear that the additional equipment being tested is leaking when, in fact, the ball valve in the Van Winkle mechanism may have become slightly unseated due to the pressure reversal. Finding such a leak may consume substantial time.

Similar problems may occur in the aforementioned U.S. Pat. No. 4,638,972 to Jones et al (in addition to those problems already mentioned) since, in that device, a pressure differential acting on the seat is relied upon to aid in making a tight seal. If the pressure differential is small or reversed, sealing problems may develop.

Aforementioned U.S. Pat. No. 3,036,807 to Lucky does appear to disclose at least one embodiment utilizing a non-axially-oriented seal. However, as previously mentioned, Lucky does not fulfill the basic requirement of equalizing the pressures above and below the rams, in the borehole, prior to opening of the rams. Also, Lucky's construction makes it difficult to remove and install the rams for replacement or repair independently of the actuators.

The mechanisms described above fail to provide a highly reliable and simply constructed seal which, when released, will equalize the pressures above and below the rams prior to opening. Those skilled in the art have long sought and will appreciate the novel features of the present invention which solves these problems.

SUMMARY OF THE INVENTION

The present invention is directed to a novel mechanism for equalizing borehole pressures above and below B.O.P. rams prior to opening them. The mechanism comprises a valve element in the form of a sealing piston with a circumferential (rather than axial) seal. The seal made by such a piston having a circumferential seal within a straight-sided, tubular sealing section of the bypass is inherently much more reliable for the constraints of operation found in an equalizing mechanism for a B.O.P. than a seal made with a ball valve or other axially oriented valve. Solid particles which may typically be found in drilling fluids do not present a problem to sealing since they are simply wiped away by the circumferential seal as the piston moves into the sealing section of the bypass and washed away by fluid when the piston moves out. Also, there can be a range of positions in which the piston can still effect a seal, so that minor axial movements of the piston do not result in leakage.

The sealing piston is preferably carried on the inner end of the actuator shaft, which enters the bypass passageway through the outer end of the ram and is connected to the ram through a lost motion connection. The lost motion allows the sealing piston to be first moved into engagement with the sealing section as the shaft moves inwardly toward the B.O.P closed position to close the bypass, and when the lost motion is finished, further inward movement of the ram shaft will carry the ram itself into its closed position. Conversely, when the shaft moves outwardly or toward the open B.O.P. position, the lost motion will first move the sealing piston relative to the ram away from engagement with the sealing section of the bypass therein, whereafter further outward movement of the shaft will carry the ram to its open position.

The use of a common bore in the ram to form at least a part of the bypass passageway as well as the lost motion receptacle for the end of the ram shaft simplifies the construction and operation. The piston is easily removable from the bypass, which facilitates change out of the rams. With the circumferential sealing scheme, once the sealing piston moves into the sealing section of the bypass passageway, it is virtually impossible for the seal to be broken except upon a fairly substantial amount of axial movement of the piston.

An inclined guide may be provided to guide the piston into the sealing section. Once the seal on the piston moves into the sealing section, an excellent seal is formed and is not dependent on springs or uniformly high differential pressures to sustain the seal's resistance to leakage.

The simplicity of the design reduces manufacturing costs and increases reliability of operation. Usage of the equalizing mechanism of the present invention prolongs the life of the ram seals and allows for a smaller ram operator, which reduces costs and space requirements.

In a preferred embodiment, the sealing piston is carried on a hollow carrier loosely receiving the inner end of the ram shaft so that there is lateral play therebetween. This allows greater flexibility in facilitating entry of the sealing piston into the sealing section. If the ram shaft has less lateral play due to seals around the ram shaft or for other reasons, there is still abundant lateral play introduced by the carrier to allow reliable and easy movement of the sealing piston into the sealing section. This remains true even if there is relative movement between the rams and the ram shaft, which may cause the sealing section to become misaligned with respect to the sealing piston.

Various features and advantages of the present invention will be made apparent by the following detailed description, claims and drawings, wherein:

DETAILED DESCRIPTION OF THE PREFERRED EMBODIMENTS

Figure 1:
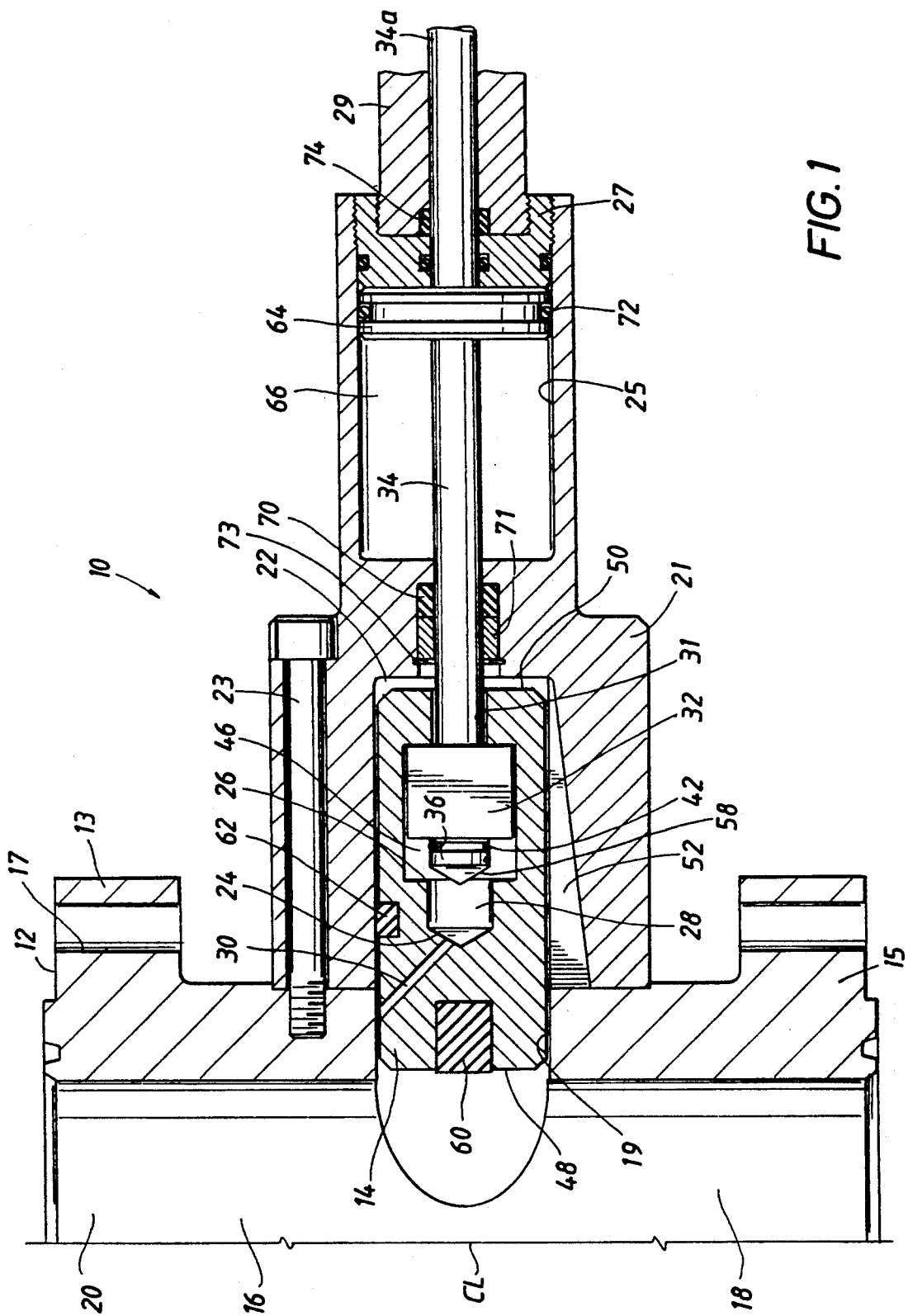
FIG. 1 is an elevational view, in section, showing one half of a B.O.P. with an equalization mechanism in accord with one embodiment of the present invention.

FIG. 1 illustrates one-half of a blowout preventer of a type to which the present invention can be applied. Since the blowout preventer is of a type well known in the art, it will only be described briefly herein. In use, the blowout preventer is mounted generally coaxially with the adjacent portion of the well, and the centerline of the blowout preventer is shown at CL. The right-hand half of the blowout preventer is shown, and it should be understood that the left-hand half is a mirror image, except that it may or may not include a pressure equalizing mechanism, as explained below.

The blowout preventer 10 is of a type commonly known as a "ram-type" and includes a housing having a central generally tubular portion 12 having upper and lower flanges 13 and 15 extending radially outwardly for connecting the blowout preventer to other apparatus adjacent the top of the well, in a well known manner, as by bolts which can pass through holes 17. The central portion 12 of the housing has a pair of diametrically opposed lateral openings, one of which is shown at 19, intersecting the central bore of housing portion 12. The housing further includes a pair of branches, one of which is shown at 21. The branch 21 has a cavity 22 opening through its laterally innermost end in communication with opening 19, and rigidly secured to housing portion 12 as by screws, one of which is shown at 23. A similar branch portion of the housing is secured in communication with the lateral opening opposite opening 19 (not shown).

A ram 14 disposed generally in cavity 22 is reciprocable, so that it can be advanced into and through opening 19, and into the central bore of housing portion 12. When the ram 14 is so advanced, and its opposing ram (not shown) is similarly advanced, they can close off the central bore, thereby dividing it into upper 16 and lower 18 pressure zones. As is understood by those of skill in the art, some B.O.P. rams have their innermost ends designed to seal directly against each other in an otherwise empty portion of the central bore, while others are designed to seal about a piece of drill pipe or the like, and thus close the bore in cooperation with that pipe. These two different types of B.O.P.s are typically stacked in series in a well, and the present invention can be applied equally well to either type.

To assist in this sealing, the rams are provided with elastomeric seals or rubbers, of a form well known in the art. Each ram rubber has a laterally innermost portion 60 for sealing against the rubber of the opposing ram and/or the OD of an interposed drill pipe. The rubber has a pair of lateral runs (not shown) which extend from the innermost portion 60 outwardly along the opposite sides of the cavity 22, sealing between the walls of that cavity and the ram 14 itself. Interconnecting the outer ends of these lateral runs is an arcuate upper run 62 which seals between the ram 14 and the wall of cavity 22 circumferentially about the upper portion thereof.

Reciprocation of ram 14 is effected by a shaft 34 connected thereto and extending radially outwardly to an actuator piston 64 reciprocably mounted in an actuator cylinder 25 defined by an outer portion of the housing branch 21. Intermediate cavity 22 and cylinder 25, branch portion 21 has a zone of reduced inner diameter containing an annular packing 70 for sealing between shaft 34 and housing branch 21, a bracing ring 71, and a retaining snap ring 73 for holding ring 71 against packing 70. The outer end of cylinder 25 is closed by an end piece 27 threaded thereinto and sealed with respect to both the cylinder and an outward extension 34a of the shaft by o-rings. A further annular housing part 29 is in turn threadedly received in piece 27, bored to receive shaft extension 34a, and sealed with respect thereto by seal 74. Parts 29 and 34a may extend and connect to other portions of apparatus as well known in the art.

Cylinder 25 is provided with means (not shown) for introducing fluid pressure to opposite sides of piston 64, and venting such pressure alternatively, as well known in the art.

A pressure equalizing mechanism representing an embodiment of the present invention is incorporated in the ram 14 and the associated inner portion of shaft 34. More specifically, a bypass passageway is provided through ram 14 which, if opened, allows fluid pressure communication between upper and lower zones 16 and 18 even if the rams 14 are closed. That bypass passageway includes a generally central bore extending lengthwise into ram 14 from its outer end, and having an outermost shaft guide portion 31, an enlarged intermediate portion 46 of rectangular cross section, and an innermost sealing section 28, which is straight-sided, and more specifically, cylindrical. The end of this bore 31, 46, 28 terminates in a conical portion which is intersected by a branch bore 30 extending upwardly and inwardly so that it opens through ram 14 at a position disposed inwardly of the upper run 62 of the ram rubber.

Shaft 34 extends through cylindrical shaft guide portion 31 of the bypass passageway. A rectangular stop member 32 is formed on or rigidly fixed to the inner end of shaft 34 and is disposed in enlarged intermediate portion 46 of the bypass passageway. Stop 32 is shorter than enlarged intermediate portion 46 along the length of the bypass passageway so that it forms a lost motion connection between shaft 34 and ram 14. Rigidly adjoining stop 32 and extending inwardly therefrom is a cylindrical sealing piston 36 carrying an o-ring 42 sized to sealingly engage sealing section 28 of the bypass passageway. As can be seen by comparing FIGS. 1 and 2, the relative sizes of the stop 32, piston 36, and various parts of the bypass passageway are such that, when piston 64 is fully retracted, sealing piston 36 is moved outwardly out of sealing engagement with sealing section 28 of the bypass passageway, opening the bypass passageway. Fluid can flow through branch bore 30, sealing section 28, enlarged section 46, section 31 and thence between the ram 14 and cavity 22 along the outer and lower portions thereof. Although there is sufficient clearance between stop 32 and section 46, as well as between shaft 34 and section 31 to allow such flow, the flow is facilitated where sections 46 and 31 of the bypass open laterally through ram 14, as described more fully below in connection with FIG. 4. The lower portion of cavity 22 is provided with grooves 52, increasing in depth from their outer to their inner ends, to further facilitate such flow. The slope of grooves 52 helps to ensure drainage of mud and debris.

Figure 2:
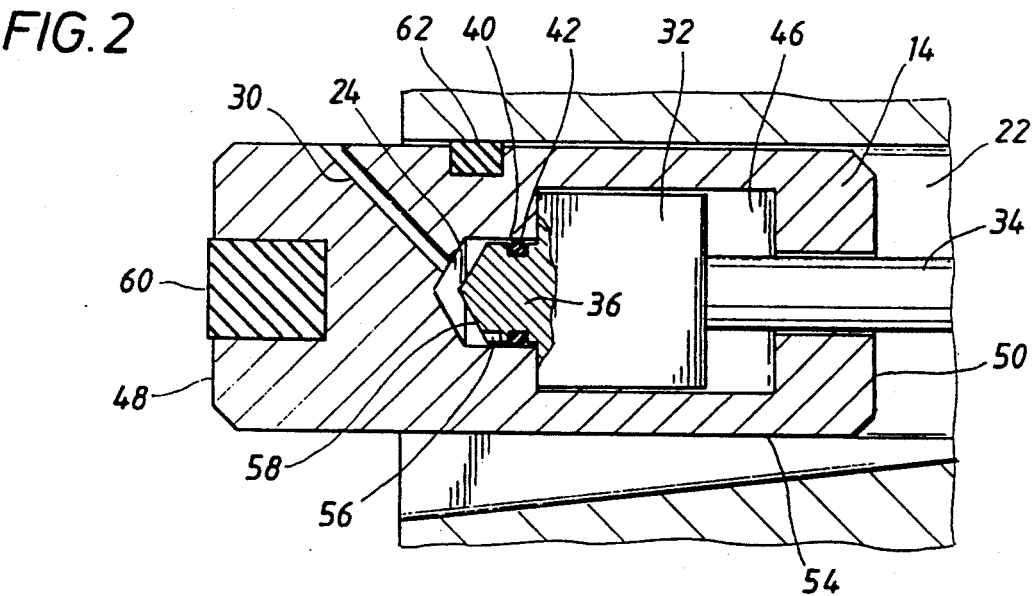
FIG. 2 is an elevational view, in section, of the equalization mechanism of FIG. 1.

When it is desired to close the rams 14, fluid pressure is applied to move piston 64 from the outer end of its cylinder 25 to the inner end. Because of the aforementioned lost motion connection, this movement of piston 64 will first move stop 32 within enlarged section 46 of the bypass passageway, thereby bringing sealing piston 36 into sealing engagement with sealing section 28 and closing the bypass passageway as shown in FIG. 2. Abutment of stop 32 with the shoulder formed between sections 46 and 28 will stop this lost motion at a point where sealing piston 36 is disposed well into sealing section 28, whereafter continued inward movement of piston 64 will carry ram 14 radially inwardly to close the central bore B.O.P. as described above. It may be noted that the inner end of piston 36 is provided with a conical guide surface 58 which can cooperate with the outer end of sealing section 28 to guide piston 36 into sealing section 28. Alternatively, the intersection of sealing section 28 with the shoulder formed between that section and section 46 could be beveled.

When it is time to open the rams 14, the fluid pressure is applied so as to move actuator piston 64 outwardly. Again due to the lost motion connection, this will first move stop 32 within enlarged section 46 of the bypass passageway from the position shown in FIG. 2 to that shown in FIG. 1. This removes sealing piston 36 and its o-ring 42 from sealing engagement with sealing section 28 of the bypass passageway. As shown in FIG. 2, a channel 56 in the outer periphery of sealing piston 36, and disposed inwardly of o-ring 42, helps to facilitate the initiation of fluid flow through the bypass passageway as soon as seal 42 has cleared the sealing section 28. Such fluid flow equalizes the pressure in zones 16 and 18, so that there is no tendency for the higher pressure (typically in zone 18) to urge the ram 14 upwardly in its cavity 22, and this in turn greatly reduces the force which must applied by actuator 25, 64 to open the rams. After the lost motion is completed, i.e. when stop 32 abuts the outer end of enlarged section 46 of the bypass passageway, continued outward movement of the actuator piston 64 will move the ram 14 outwardly to its open position, as shown in FIG. 1.

A number of advantages of this arrangement can be seen. Although certain aspects of the invention can be applied to axially oriented type valves, the sealing piston 36 and sealing section 28 serve as a substantially different type of valve for opening and closing the bypass passageway, one in which a circumferential seal is effected between two straight-sided surfaces which move into and out of alignment with each other in a telescoping manner. If there are particulates on the surface of sealing section 28, seal 42 will simply wipe them inwardly, so that it can form a good seal with surface 28. Furthermore, once seal 42 is seated in section 28, it can experience a certain amount of axial travel without losing its sealing engagement, and it is unlikely that there will be any accidental leakage until if and when the seal is deliberately moved laterally outwardly by a substantial distance. Also, because of the much greater diameter of actuator piston 64, by way of comparison to sealing piston 36, a very large force is needed to unseat seal 42 once it is engaged. The use of a portion, 28, 46, 31 of the bypass passageway receiving an inner portion of shaft 34 and the members 32 and 36 carried thereon to further serve as the lost motion connection greatly simplifies the structure, resulting in a cost saving in manufacture, and less potential for breakage, malfunction, etc. in operation.

Figure 4:
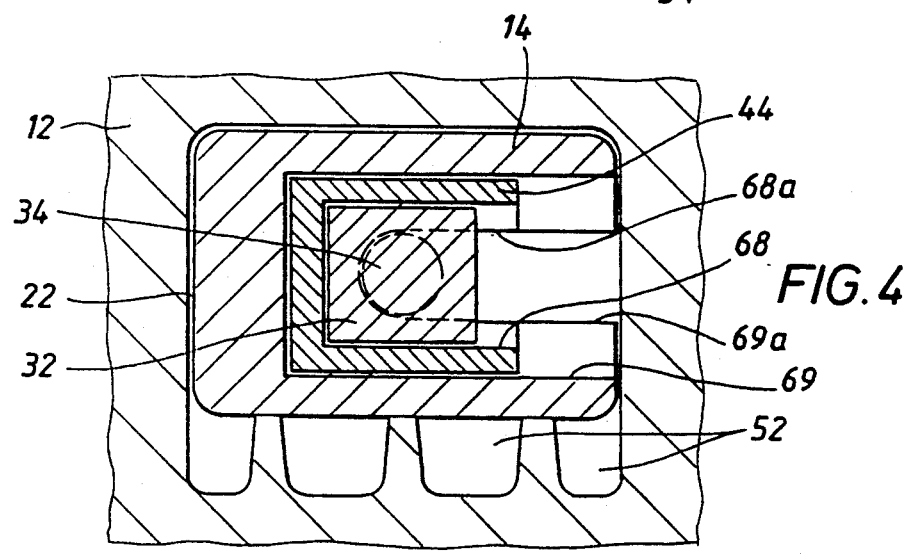
FIG. 4 is an elevational view, partially in section, along the lines 4—4 of FIG. 3.
Figure 3:
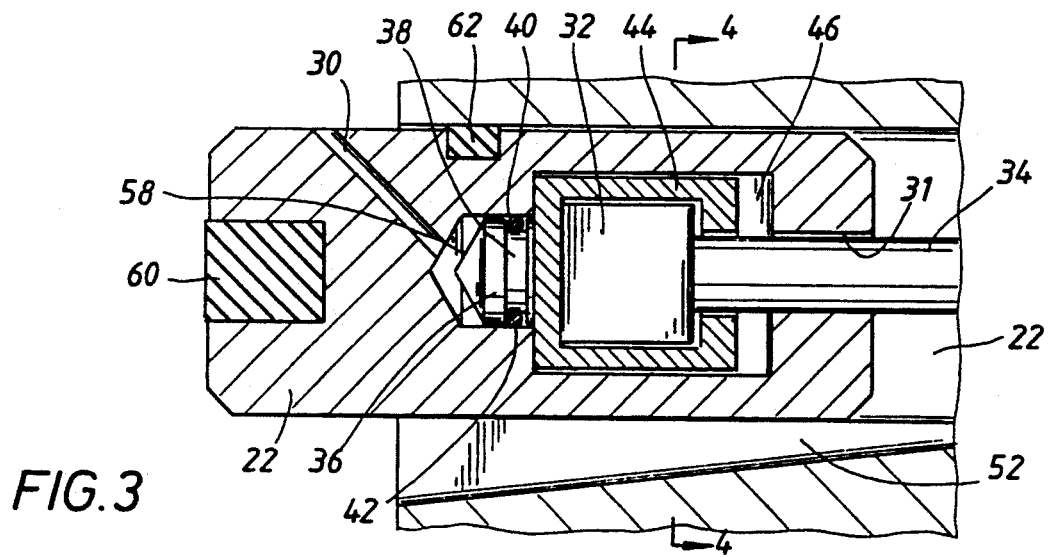
FIG. 3 is a view similar to that of FIG. 2 showing another embodiment employing a carrier.

FIGS. 3 and 4 illustrate another embodiment of the invention wherein the sealing piston 36 is rigidly carried on a hollow carrier 44 which is disposed in enlarged section 46 of the bypass passageway and somewhat loosely surrounds the block 32 on the end of shaft 34.

This provides additional lateral play with respect to ram shaft 34 so that sealing piston 36 may move laterally to correct for any movement of internal B.O.P. 10 components with respect to each other to thereby allow for a smooth entry of sealing piston 36 into sealing chamber 28. The carrier 44 is a desirable addition if ram shaft 34 has very little play, as may result from tight shaft seals 70 and 74 or seal 72 on operator piston 64.

The pressure equalizing mechanism need not interfere in any necessary ram replacement operations. Still referring to the embodiment of FIGS. 3 and 4, and particularly to FIG. 4, the enlarged section 46 and shaft receiving section 31 of the bypass passageway open laterally outwardly through one side of the ram 14 forming a slot 69 of the same vertical dimension as passageway section 46, and a smaller extension 69a sized to correspond to shaft receiving section 31. The ram 14 in the embodiment of FIGS. 1 and 2 has a similar slot or extension of the outer portions of the bypass passageway. By removing housing branch portion 21 from central portion 12, ram 14 can be removed from shaft 34, either through a door (not shown) in housing portion 21, or by advancing piston 64 until ram 14 is clear of housing portion 21.

In the case of the embodiment of FIGS. 3 and 4, the carrier 44 is separated from the ram 14 along with the shaft 34 which carries it. Then, because the carrier 44 likewise has a slot 68 in one side sized to permit removal of stop 32, and with an extension 68a aligned with and sized to permit removal of shaft 34, the stop 32 and shaft 34 can be separated from the carrier 44 if desired.

It will be appreciated that other schemes for permitting disassembly are possible. For example, the necessary slot in the ram 14 might be placed in the bottom, rather than in one side, to facilitate drainage of mud and the like.

As previously mentioned, only one of two opposed rams, and its associated housing and actuator parts have been shown. The opposing ram may have a similar pressure equalization mechanism, including bypass passageway, sealing piston and lost motion mechanism, to that shown and described above. However, this is not strictly necessary, since it only takes one bypass to equalize the pressures above and below the rams. If, however, the opposing ram does not include a complete bypass system, it is desirable that it at least be provided with a lost motion connection, having the same amount of travel as the one incorporated in the pressure equalizing mechanism of the first ram, so that the movements of the rams in opening and closing the blowout preventer will be synchronized.

It will be apparent, to those skilled in the art that many modifications and changes may be made in the above embodiments of the invention without departing from the scope and spirit of the invention. For example, two elastomeric seals such as seal 42 may be used and-/or two ports such as port 30 may be used where one of the ports goes directly to lower pressure zone 18 and/or one of the ports connects as shown to upper pressure zone 16. Likewise seal 42 could be mounted within sealing section 28 instead of around sealing piston 36. Other types of B.O.P.'s, e.g. having pipe rams, variable rams and shear rams, can incorporate various features of the invention. Therefore, the invention is not restricted to the embodiments illustrated but is limited only by the claims.

What is claimed is:

1. A blowout preventer comprising:
    a blowout preventer housing having a central bore therethrough and defining cavity means intersecting said central bore;
    closure members disposed within said cavity means for movement toward and away from each other between an open position and a closed position closing said central bore and dividing said central bore into upper and lower zones respectively above and below said closure members;
    at least one of said closure members having a bypass passageway therethrough, said bypass passageway having first and second ends disposed so as to allow communication between said upper and lower zones through said bypass passageway, and having a straight-sided, tubular sealing section intermediate said ends;
    a sealing piston reciprocable in said bypass passageway into and out of said sealing section;
    and a circumferential seal interengaging said sealing piston and said sealing section when said sealing piston is in said sealing section.

2. The apparatus of claim 1, wherein said sealing section is cylindrical and said circumferential seal is carried on said sealing section.

3. The apparatus of claim 2 wherein said circumferential seal comprises an o-ring.

4. The apparatus of claim 2 further comprising an actuator shaft associated with said one closure member via a lost motion connection for so moving said closure member between said open and closed positions and carrying said sealing piston for joint motion with said shaft, relative movement between said shaft and said closure member in said lost motion connection, when moving toward said closed position, first moving said circumferential seal into engagement with said sealing section, and when moving toward said open position, first moving said circumferential seal out of engagement with said sealing section.

5. The apparatus of claim 4, wherein said one closure member has a longitudinal bore defining at least a portion of said bypass passageway including said sealing section and having an outer end opening reciprocably receiving said shaft and defining said second end of said bypass passageway.

6. The apparatus of claim 5 wherein said bore in said one closure member further comprises an enlarged section intermediate said end opening and said sealing section, said lost motion permitting movement of said sealing piston between positions generally within said sealing section and within said enlarged section, respectively.

7. The apparatus of claim 6 wherein said one closure member carries an upper seal run sealing between an inner wall of said cavity means and an upper surface of said closure member; said first end of said bypass passageway being defined by a branch bore communicating with an inner portion of said sealing section and extending upwardly through said closure member to open inwardly of said upper seal run.

8. The apparatus of claim 7 wherein said inner wall of said cavity means has a plurality of grooves in a lower portion thereof to facilitate fluid flow along the lower surface of the closure member.

9. The apparatus of claim 8, wherein said grooves are aligned substantially parallel to the axis of said shaft and have a variable depth such that the depth of said grooves is greater proximate said bore and lesser distal said bore.

10. The apparatus of claim 6 wherein said shaft carries an enlarged stop member outwardly of said sealing piston and engageable with opposite ends of said enlarged section of said bore and said closure member to limit said lost motion.

11. The apparatus of claim 6 wherein said blowout preventer housing defines an actuator cylinder receiving said shaft, said shaft carrying an actuator piston within said actuator cylinder; and said actuator piston and cylinder are of substantially greater diameter than said sealing piston.

12. The apparatus of claim 6 wherein at least one of said bypass passageway or said sealing piston has an axially and radially inclined guide surface associated therewith for guiding said sealing piston into said sealing section.

13. The apparatus of claim 12, wherein said guide surface is formed adjacent an inner end of said sealing piston.

14. The apparatus of claim 6 wherein said sealing piston has a channel in an outer peripheral surface thereof, inwardly of said circumferential seal to allow fluid flow through said sealing section during outward movement of said sealing piston prior to said sealing piston being completely withdrawn from said sealing section.

15. The apparatus of claim 5 further comprising:
a seal carrier carrying said sealing piston and loosely surrounding an inner portion of said shaft for lateral play therebetween.

16. A blowout preventer comprising:
a blowout preventer housing having a central bore therethrough, cavity means intersecting said central bore, and an actuator cylinder communicating with said cavity means;
closure members disposed within said cavity means for movement toward and away from each other between an open position and a closed position closing said central bore and dividing said central bore into upper and lower zones respectively above and below said closure members;
at least one of said closure members having a bypass passageway therethrough, said bypass passageway having first and second ends disposed to allow communication between said upper and lower zones through said bypass passageway, and having an annular sealing surface intermediate said ends;
an actuator piston disposed within said actuator cylinder;
an actuator shaft extending inwardly from said actuator piston and having an inner end received in said one closure member for limited lost motion type relative reciprocal movement;
a seal carrier disposed in said one closure member and surrounding an inner portion of said shaft for lateral play therebetween and having a valve member thereon adapted for sealing engagement with said sealing surface of said bypass passageway.

17. The apparatus of claim 16, further comprising:
a circumferential seal carried on said valve member.

18. The apparatus of claim 16, wherein:
said valve member is reciprocal into and out of said sealing section.

19. A blowout preventer, comprising:
a blowout preventer housing having a central bore therethrough and defining cavity means intersecting said central bore;
closure members disposed within said cavity means for movement toward and away from each other between an open and a closed position closing said central bore and dividing said central bore into upper and lower zones respectively above and below said closure members;
at least one of said closure members having a bypass passageway therethrough, said bypass passageway having first and second ends and having a sealing section intermediate said ends;
a sealing piston reciprocable in said bypass passageway into and out of said sealing section;
an actuator shaft associated with said one closure member via a lost motion connection for so moving said closure member between said open and closed positions and carrying said sealing piston for joint motion with said shaft, relative movement between said shaft and said closure member in said lost motion connection, when moving toward said closed position, first moving said sealing piston into said sealing section, and when moving toward said open position, first moving said sealing piston out of said sealing section; and
a seal carrier carrying said sealing piston and loosely surrounding an inner portion of said shaft for lateral play therebetween.

* * * * *